(12) United States Patent
Schelling et al.

(10) Patent No.: US 11,007,041 B2
(45) Date of Patent: May 18, 2021

(54) MILLING MACHINE AND BLANK FOR A DENTAL COMPONENT

(71) Applicant: Amann Girrbach AG, Koblach (AT)

(72) Inventors: Peter Schelling, Hohenems (AT); Johannes Anders, Feldkirch (AT)

(73) Assignee: Amann Girrbach AG

( * ) Notice: Subject to any disclaimer, the term of this patent is extended or adjusted under 35 U.S.C. 154(b) by 477 days.

(21) Appl. No.: 15/520,117

(22) PCT Filed: Oct. 8, 2015

(86) PCT No.: PCT/EP2015/001982
§ 371 (c)(1),
(2) Date: Apr. 19, 2017

(87) PCT Pub. No.: WO2016/062375
PCT Pub. Date: Apr. 28, 2016

(65) Prior Publication Data
US 2017/0319303 A1    Nov. 9, 2017

(30) Foreign Application Priority Data

Oct. 20, 2014    (DE) ..................... 10 2014 015 423.8

(51) Int. Cl.
*A61C 13/00*     (2006.01)
*B23B 31/107*    (2006.01)
*A61C 5/77*      (2017.01)

(52) U.S. Cl.
CPC ............ *A61C 13/0022* (2013.01); *A61C 5/77* (2017.02); *B23B 31/1075* (2013.01);
(Continued)

(58) Field of Classification Search
CPC ... A61C 5/77; A61C 13/0004; A61C 13/0022; A61C 8/0022; A61C 8/0025; Y10T 409/305824; Y10T 409/308792; Y10T 279/17821; Y10T 279/17837; Y10T 279/17846; B23B 31/1075;
(Continued)

(56) References Cited

U.S. PATENT DOCUMENTS 1,783,541 A * 12/1930 Hogg ................... B23B 31/103
                                                    279/77
4,615,678 A   10/1986 Moermann et al.
(Continued)

FOREIGN PATENT DOCUMENTS

DE          29502137 U1    7/1996
DE       202008006553 U1    8/2008
(Continued)

*Primary Examiner* — Erica E Cadugan
*Assistant Examiner* — Michael Vitale
(74) *Attorney, Agent, or Firm* — The Webb Law Firm (57) ABSTRACT

The invention relates to a milling machine for producing a dental component, such as a crown or an abutment for example, from a blank. The milling machine includes a stop and a holder for the blank. The invention is characterized in that the holder is designed such that the holder can be surrounded by a mounting, which surrounds the holder, of the blank, and the surrounding mounting of the blank can be brought into contact with the stop for positioning purposes. The invention further relates to a corresponding blank.

6 Claims, 3 Drawing Sheets

(52) U.S. Cl.
CPC ............... *Y10T 279/17821* (2015.01); *Y10T 409/305824* (2015.01); *Y10T 409/308736* (2015.01); *Y10T 409/308792* (2015.01)

(58) Field of Classification Search
CPC . B23B 31/1076; B23B 31/1077; B23B 31/11; B23B 31/1107; B23B 31/1105; B23B 31/1122; B23B 31/1115
USPC ..... 409/168, 221; 433/201.1; 279/79, 83, 99
See application file for complete search history.

(56) References Cited

U.S. PATENT DOCUMENTS

| | | | |
|---|---|---|---|
| 5,342,696 A | | 8/1994 | Eidenbenz et al. |
| 5,388,936 A * | | 2/1995 | Mihic ................ B23B 31/1075 408/239 R |
| 5,939,211 A | | 8/1999 | Mörmann |
| 6,224,371 B1 | | 5/2001 | De Luca |
| 6,627,327 B2 * | | 9/2003 | Reidt ................ A61C 13/0022 428/34.1 |
| 8,402,624 B2 | | 3/2013 | Galehr |
| 8,622,377 B2 * | | 1/2014 | Konrad ............. A61C 13/0022 269/287 |
| 2004/0120781 A1 | | 6/2004 | Luca et al. |
| 2005/0276672 A1 | | 12/2005 | Prince et al. |
| 2006/0035776 A1 | | 2/2006 | Duncan et al. |
| 2006/0090361 A1 | | 5/2006 | Matsuda et al. |
| 2007/0050072 A1 * | | 3/2007 | Schwotzer ......... A61C 13/0022 700/116 |
| 2009/0275000 A1 * | | 11/2009 | Jung ................. A61C 13/0004 433/223 |
| 2010/0028834 A1 * | | 2/2010 | Galehr ............... A61C 13/0022 433/213 |
| 2011/0018184 A1 * | | 1/2011 | Steger ................ A61C 13/0004 269/57 |
| 2011/0171603 A1 | | 7/2011 | Kim |
| 2012/0148985 A1 * | | 6/2012 | Jung ....................... A61C 13/08 433/212.1 |
| 2012/0177456 A1 * | | 7/2012 | Jung ......................... B23C 3/00 408/1 R |
| 2012/0214133 A1 | | 8/2012 | Jung |
| 2012/0233830 A1 | | 9/2012 | Gapp et al. |
| 2013/0244846 A1 | | 9/2013 | Koch |
| 2013/0330689 A1 | | 12/2013 | Woldegergis et al. |
| 2015/0093719 A1 | | 4/2015 | Beeby |
| 2015/0093720 A1 | | 4/2015 | Beeby et al. |
| 2015/0099243 A1 | | 4/2015 | Steger |

FOREIGN PATENT DOCUMENTS

| | | | | |
|---|---|---|---|---|
| DE | 102007061928 B3 | | 8/2009 | |
| DE | 102008030050 A1 | | 8/2009 | |
| DE | 102008013829 A1 | | 10/2009 | |
| DE | 102011005797 A1 | | 9/2012 | |
| DE | 102011109939 A1 | | 2/2013 | |
| DE | 202014103291 U1 | | 7/2014 | |
| EP | 0160797 A1 | | 11/1985 | |
| EP | 0455853 A1 | | 11/1991 | |
| EP | 0508152 A2 * | | 10/1992 | ......... B23B 31/1075 |
| EP | 1652490 A2 | | 5/2006 | |
| EP | 2036516 A2 | | 3/2009 | |
| EP | 2499993 A1 | | 9/2012 | |
| EP | 2674128 A2 | | 12/2013 | |
| JP | 10094551 A | | 4/1998 | |
| JP | 10118097 A | | 5/1998 | |
| JP | 2000135228 A | | 5/2000 | |
| KR | 1020110045826 A | | 5/2011 | |
| KR | 101536643 B1 * | | 7/2015 | |
| WO | 2013167903 A1 | | 11/2013 | |
| WO | 2013167904 A1 | | 11/2013 | |

* cited by examiner

MILLING MACHINE AND BLANK FOR A DENTAL COMPONENT

CROSS-REFERENCE TO RELATED APPLICATIONS

This application is the United States national phase of International Application No. PCT/EP2015/001982 filed Oct. 8, 2015, and claims priority to German Patent Application No. 10 2014 015 423.8 filed Oct. 20, 2014, the disclosures of which are hereby incorporated in their entirety by reference.

BACKGROUND OF THE INVENTION

Field of the Invention

The invention relates to a milling machine for producing a dental component from a blank, such as a crown or an abutment, from a blank, and a blank from which a dental component can be milled, such as for example a crown or an abutment.

Description of Related Art

For the production of dental components, such as, for example, crowns or abutments, inter alia milling machines are used. Milling machines in connection with dental technology are therefore known from prior art.

For example, US 2006/0035776 A1 shows a milling machine, where a blank is via a spindle having a specific shape inserted into a respective mounting of the milling machine. Any connection geometry is there not yet defined by the blank or a part which is respectively connected to the blank, so that this is only defined later in the course of the production process.

Furthermore, US 2012/0214133 A1 discloses securing the blank, from which the later dental component is to be formed, via a screw connection which is connected to the blank and later anchored in the jaw. For this purpose, this mounting of the blank, or of the later component, is inserted into the milling machine and is connected thereto for the purpose of fixation.

DE 10 2011 005 797 A1 describes a workpiece holder on which the blank is arranged. The workpiece holder there has a planar surface on which the blank can be arranged. This arrangement of the workpiece holder and the blank is then arranged in the holder of the milling machine in a positive-locking and force-locking manner.

DE 10 2011 109 939 A1 shows a work-holding attachment for one or more blanks, where the blanks together with the work-holding attachment can be clamped to the milling machine in order to mill the dental components from the blanks.

DE 10 2008 013 829 A1 further shows a blank with a coding and a method for fabricating a dental formed part from this blank. The coding of the blank is there used as an information carrier for properties of the blank body in order to determine the position, the dimensions or the type of structure by scanning or measuring the blank.

EP 2 674 128 A2 likewise shows a method for the production of a laboratory analog for dental implants from a blank.

EP 0 160 797 shows a blank body which has an extension member which can be inserted into a milling machine. For this purpose, one or more reference surfaces are provided which define a specific initial position of the blank relative to the milling machine.

EP 0 455 853 A1 also discloses a milling machine with which dental components can be produced from blanks. For this purpose, a spindle for receiving the workpiece or blank, respectively, and two tool spindles are provided which can be made to rotate relative to the workpiece. The tools connected to the tool spindles can be moved towards or away from the workpiece while the tool spindles are controlled and moved around the workpiece according to predetermined contour data.

US 2005/0276672 A1 also shows a blank from which a dental workpiece, such as a crown, can be produced. This blank is likewise associated with a holder which can be inserted into a corresponding base. The workpiece can be identified and fixed in the milling machine by way of markings on the holder.

JP 2000 135 228 A also shows a milling machine into which a blank can be inserted for the fabrication of a dental component. This blank is also associated with a holder on which one or more notches can be formed in order to enable a correct fit or identification of the component.

With the milling machine shown in JP 10-118097, several blanks can be arranged on respective holder tables in a milling machine and the respective dental components can be fabricated from these blanks.

DE 295 02 137 U1 discloses a clamping mechanism for a workpiece to be held in a hollow shaft from which, for example, a crown can be fabricated. For this purpose, a spring-loaded, slotted collet is provided which at the end near the workpiece has a clamping cone which can interact with a ring inserted in the hollow shaft. At the end away from the workpiece, the collet comprise a stopper ring axially movable in the hollow shaft as well as a pressure spring which is supported on the stopper ring and the conical ring, and a threaded spindle guided in the hollow shaft. Furthermore, provided and arranged between the threaded spindle and the collet is a reduction spindle, one end of which engages with the threaded spindle and the other end of which abuts against the collet in a force-engaging manner.

In the device for fabricating a dental component provided in EP 1 652 490 A2, the blank is arranged on a plate which can in turn be detachably connected to the milling machine. The plate there determines a defined orientation relative to the milling machine.

According to KR 10 2011 004 58 26 A the blank is inserted into the milling machine by way of a screw with a thread. The blank is there with adhesive connected to a fixed axis of the milling machine.

Alternatively, DE 20 2008 006 553 U1 shows a dental implant handling device with a base plate, with a chuck mounted on the base plate for receiving a laboratory implant, as well as with a manually actuable collet for releasably clamping the laboratory implant.

According to EP 2 036 516 A2, a holder being connected to the blank is provided for holding this blank and can be detachably connected to an adapter in order to be mounted in the workpiece receiver of a cutting tool.

According to DE 10 2007 061 928 B3, the blank is inserted into a holder of the milling machine. Due to the shape of the recess of the holder, the blank can be inserted into the holder in two orientations, namely in a first orientation and in an orientation rotated by 180° relative thereto.

A workpiece holder for holding a blank for the production of dental formed parts is furthermore disclosed in DE 10 2008 030 050 A1, where the workpiece holder comprises a base on which the blank can be attached. Furthermore, a shank region is provided on the side of the base facing away from the blank and can be used for insertion into the holder of a cutting machine. This shank comprises two abutment surfaces, where at least one abutment surface is inclined relative to the longitudinal axis of the base or the shank to enable attachment in the cutting machine.

A holder for blanks for the production of dental components is known from WO 2013/167903 A1, where the blanks are mounted directly on the blank material laterally at the holder and are machined in this position.

WO 2013/167904 A1 shows a similar feature, where several features are provided in the holder which enable a well-defined attachment to the milling machine and thereby ensure alignment of the plurality of blanks fastened laterally to the holder.

Furthermore, DE 20 2014 103 291 U1 shows a blank which can be inserted into a holder region by way of a fastening projection attached to the blank. A groove is provided on the blank and a locating pin in the holder region for the purpose of aligning the blank in a precise position relative to the holder region. A lock nut extending around the entire holder region is used for clamping the blank.

No connection geometry is yet provided according to present prior art during the fabrication of the dental component, in particular the crown or an abutment. Furthermore, clamping the blanks into the milling machine is not provided unambiguously with respect to the alignment of the workpiece later to be obtained, and slight miss-positioning of the blank, such as, for example, canting, can occur during clamping into the milling machine, so that the workpiece fabricated from the blank can comprise faults. Furthermore, several components are used, firstly, to enable attachment of the blank in the milling machine and, secondly, to ensure a desired orientation of the blank. The problem there arises that even minor faults during clamping and misalignment between the devices for securing a desired orientation and the holder can have a considerable influence on the quality of the dental component.

SUMMARY OF THE INVENTION

Object

Starting out from known prior art, it is therefore an object of the present invention to provide an improved holding device for a blank for the fabrication of a dental component with regard to correctly holding and aligning the blank and to provide a blank configured accordingly.

Solution

This object, according to the invention, is satisfied by a milling machine for producing a dental component, such as a crown or an abutment, wherein said milling machine comprises a stop and a holder for said blank, wherein said holder is designed such that it can be surrounded by a mounting, which surrounds said holder, of said blank, and the surrounding mounting of said blank can be brought into contact with said stop for positioning purposes. Also provided is a blank, from which a dental component, such as a crown or an abutment, can be milled, where said blank on one side comprises a pin which defines a connection geometry of said dental component, wherein said blank on the opposite side comprises a surrounding mounting with which a holder of a milling machine can be surrounded, and where said surrounding mounting can be brought into contact with a stop of said milling machine, where said surrounding mounting comprises two openings. Advantageous developments of the invention are comprised in the dependent claims.

The milling machine according to the invention is characterized in that the holder is designed such that the holder can be surrounded by a mounting, which surrounds the holder, of the blank and the surrounding mounting of the blank can be brought into contact with the stop for positioning purposes. Positive-locking positioning of the blank on the holder can thereby be ensured. By providing the stop, a well-defined distance between the milling machine and the beginning of the blank is ensured so that faults in the production of the blank can be considerably reduced, in particular with regard to the length of the dental component later to be created.

According to one embodiment, it can be provided that devices are provided on the holder for a detachable connection to the surrounding mounting. These devices can further improve the positive-locking and force-locking connection of the blank to the milling machine so that inaccuracies in the production of the dental component can be reduced.

It is in one development of this embodiment provided that the devices comprise at least one thread for a screw. By inserting a correspondingly shaped screw, fixating a blank being inserted into the milling machine with very high precision is possible so that motions or misalignments of the blank in the direction of translation or in the direction of rotation can be avoided.

In a further embodiment, the holder comprises two threads for screws, where a connecting line of the threads extends through the longitudinal axis of the holder. The accuracy in positioning the blank in the milling machine can thereby be further improved over using one screw. If the individual screws are of different shape and/or size, then false orientation of the blank by, for example 180°, can also be prevented.

It is according to a further embodiment provided that the stop defines a plane and the holder has a longitudinal axis perpendicular to the plane, where the holder is shaped symmetrically or asymmetrically with respect to the longitudinal axis. The symmetrical shape of the holder can make it easy for the user to place the blank by way of the surrounding mounting, whereas providing a holder that is with regard to the longitudinal axis formed asymmetrically determines the orientation of the blank placed on the holder so that faulty orientations can be prevented.

It is in one development of this embodiment provided that the holder is with respect to the longitudinal axis shaped asymmetrically and has at least one flat surface parallel to the longitudinal axis.

It is in one development of the preceding embodiments provided that the shape of the holder defines the orientation of the blank relative to the stop. Faulty alignments of the blank can thereby be prevented so that correct positioning of the blank can also be ensured with regard to a later connection geometry of the dental component.

The blank according to the invention on one side comprises a pin which defines a connection geometry of the dental component and is further characterized in that the blank on the opposite side comprises a surrounding mounting with which a holder of a milling machine can be surrounded and wherein the surrounding mounting can be brought into contact with the stop of the milling machine, where the surrounding mounting comprises two openings. By providing the pin defining the connection geometry, the entire component can in the milling machine already be produced from the blank, also with regard to the later connection geometry. The surrounding mounting enables a positive-locking and force-locking fit in the milling machine so that the dental component can be formed with high precision also with regard to the later connection geometry. The pin is there to be understood as any component which allows the dental component to be fitted into a holder or arrangement in the jaw. This includes not only pins for plug connections but also screws with threads. The shape of the pin can be angular, but also round. It can be shaped to be cylindrical or conical. Other shapes are also conceivable. For example, connecting elements can be guided through the openings provided to establish a detachable connection to the holder.

It is in one embodiment of the blank provided that the surrounding mounting has a substantially cylindrical outer shape, where the mounting has a substantially cylindrical inner shape or an inner shape which is not symmetrical with respect to a longitudinal axis of the blank. While the symmetrical inner shape is significantly easier to fabricate, the non-symmetrical inner shape of the mounting already allows for a defined orientation of the blank in the milling machine, for example, also with respect to the connection geometry.

It is in one development of these embodiments provided that the surrounding mounting comprises at least one opening through which connecting elements, such as, for example, screws, can be passed in order to establish a detachable connection to the holder of the milling machine. By use of corresponding connecting elements being passed through, which connect the surrounding mounting to the milling machine, a positive-locking and force-locking fit of the surrounding mounting and thereby of the blank in the milling machine can be ensured so that faults in the production of the dental component from the blank can be further reduced.

It is in a further development provided that the position of the openings depends on the connection geometry prescribed by the pin. An alignment as precise as possible of the dental component with respect to its later connection geometry in the milling machine can thereby be ensured.

It is according to a further embodiment provided that the openings are formed as recesses on the end of the surrounding mounting facing away from the blank.

It can be provided that the end of the surrounding mounting facing away from the blank is substantially designed as a flat ring or comprises ring segments which can be brought into contact with the stop of the milling machine. The length of the mounting determines an orientation in the longitudinal direction of the blank relative to the milling machine. If the openings are designed as recesses at the lower end of the mounting, i.e. in the region of the ring, then a positive-locking and force-locking fixation of the blank with very high accuracy can be ensured.

Furthermore, a blank according to one of the preceding embodiments is provided in a milling machine according to one of the above-mentioned embodiments, where the surrounding mounting surrounds the holder and the surrounding mounting is brought into contact with the stop of the milling machine at the end facing away from the blank. This arrangement offers the advantage that the positive-locking and force-locking fit of the blank on the holder is made possible by the surrounding mounting and at the same time a well-defined distance of the blank from the stop is defined by the length of the surrounding mounting which is brought into contact with the stop of the milling machine. Since the surrounding mounting at the same time determines the position of the blank relative to the milling machine in dependence of the connection geometry, components for the alignment of the blank can be saved and sources of error can thereby be avoided. This results in very precise alignment of the blank relative to the milling machine, which allows for very high-precision fabrication of the dental component.

DETAILED DESCRIPTION

Figure 1:
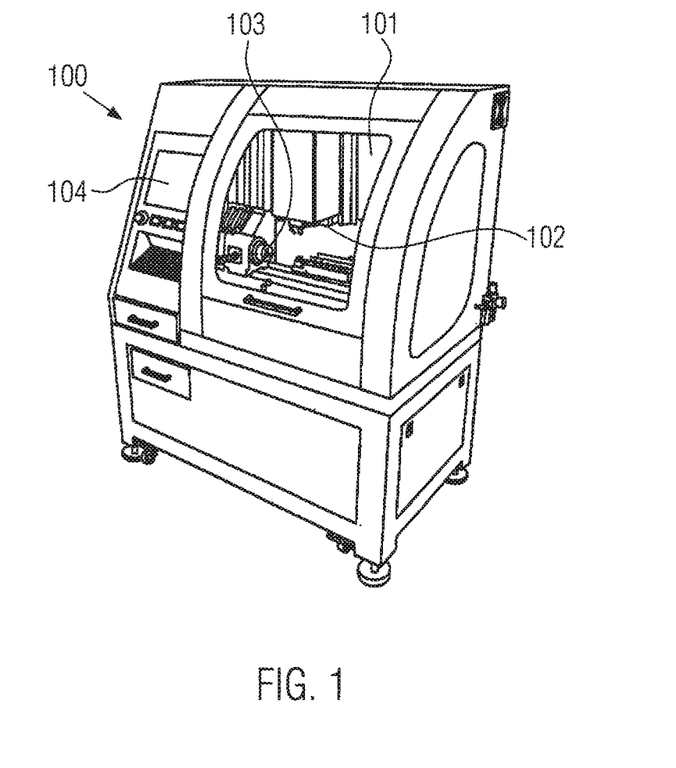
FIG. 1 Schematic representation of a milling machine.

FIG. 1 schematically shows the basic structure of a milling machine 100, as it is also known, for example, from prior art. This milling machine can comprise a cover 101 in which the remaining components of the milling machine are arranged. The cover can be divided into several individual regions and in particular comprise an inspection region through which the component can be observed during production. Furthermore, a hatch or the like can be provided in order to introduce a blank from which a toothed technical component, such as a crown, is to be produced, into milling machine 100. In addition, but not necessarily, an operating terminal 104 can be provided on milling machine 101, which, for example, allows data input with regard to the manufacture of the dental component. Milling machine 100 further comprises one or more cutting tools 102 with which a blank inserted into milling machine 100 can be machined. Furthermore, a holding device 103 is provided in a holding region in which the blank can be arranged or clamped in.

The blank, from which the dental component is to be fabricated, can there either be fixedly mounted in holding device 103 or can be rotatably arranged relative to the holding device. In the first case, one or more tools mounted to be rotatable and movable in the direction of the blank are used for machining the blank. If the blank itself is rotatably mounted with respect to the cutting tools, then the cutting tool is in dependence of the contour of the dental component to be produced from the blank commonly moved toward or away from the blank while the blank is rotated, for example, about its longitudinal axis.

The blank can there in principle have any desired shape. It can be a cylinder but also a cuboid or a cuboid with rounded or flattened edges. A geometrical structure that basically corresponds to the dental component can like wise be used, such as a cone or an ellipsoid. The size of the blank can vary depending on the later size of the dental component. It can there extend in all directions over several millimeters, but also up to 2 or 4 cm in one or more directions.

A ceramic compound can commonly be used as the starting material for the blank. However, plastic materials or metal alloys can also be used. Materials are basically used which can be machined using cutting methods. Not only mechanical tools can there be used, but also lasers can be employed. Milling machine 100 therefore comprises not only embodiments which remove material layers from the blank by use of mechanical force, but can also comprise laser tools that evaporate material from the blank in order to produce the dental component.

Figure 2:
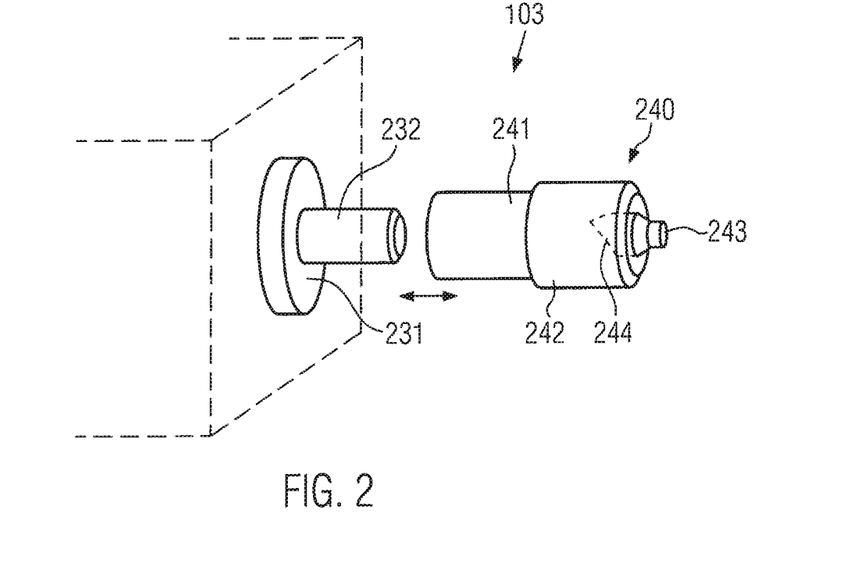
FIG. 2 Enlarged schematic view of the holding region and a blank.

FIG. 2 shows a more detailed schematic view of the holding region with holding device 103 of the milling machine. The parts of holding device 103 which are crucial for the invention are there shown having solid lines, whereas the remaining components of the holding device are there indicated as a dashed cuboid. The dashed structure is not to be understood as being restrictive of the shape of holding device 103, but is intended to serve only as a reference point for holder 232 and stop 231.

It is according to the invention provided that a stop 231 is arranged in the holding device. This stop can be configured as shown, for example, as an elevation having a cylindrical shape. However, the shape of the stop is basically arbitrary. In addition to a cylindrical shape, a cuboid shape or other structures can there also be used. Irregular shapes are also conceivable. Stop 231 according to one embodiment defines a plane facing away from holding device 103. A holder 232 is arranged in this plane. According to the invention, the blank can be arranged in this holder 232. The holder is preferably arranged perpendicular to the stop so that a longitudinal axis of the holder extends through the stop and forms a normal of the stop, in particular of the plane, or runs parallel thereto, respectively. The longitudinal axis there extends parallel to an at least partially curved surface area of the holder. If the holder is formed, for example, as a cylinder or as a body with a partially cylindrically shaped outer surface, then the longitudinal axis runs parallel to the cylindrically shaped outer surface.

The blank is also shown in FIG. 2. Blank 240 consists, firstly, of the actual blank material 242 from which the dental component is to be produced, and beyond that comprises an element 243. This element 243 can be configured, for example, as a pin or as a screw thread. In principle, element 243 defines a connection geometry for the dental component to be produced from blank 240.

Connection geometry is understood as being a direction or orientation being prescribed by element 243 in which the dental component can be inserted into the jaw of a patient. This connection geometry therefore represents the predetermined orientation of the dental component. In order to ensure proper functioning and correct installation of the dental component, the dental component being milled from blank 240 must in shape and orientation match the connection geometry.

An incisor tooth can as an illustrative example be fabricated from blank 240 as a dental component. Incisors have a certain orientation in the jaw of a patient. In order to replace the original incisor tooth of the patient with a dental component, the original tooth can have been removed and a corresponding thread or connecting elements can be connected to the jaw in the free space, into which the dental component can then be inserted.

The orientation of the dental component with respect to the connecting elements is then defined by element 243, for example, by a corresponding screw or a pin. It is therefore clear that the structure of the dental component fabricated from blank 240 must be produced in dependence of the connection geometry in order to ensure that the replacement incisor is not slanted or twisted relative to the actually intended position. FIG. 2 schematically by way of example shows the shape of an incision tooth 244 as a dental component to be fabricated from blank 240.

Furthermore, blank 240 on the side opposite to the connection geometry or element 243, respectively, comprises a surrounding mounting 241. This surrounding mounting is configured such that it can be brought into contact with holder 232 or can surround holder 232, respectively, when the blank is inserted into the milling machine. For this purpose, surrounding mounting 241 is at least in part configured as a hollow cylinder, where the free area within the hollow cylinder corresponds to the outer shape of holder 232 on milling machine, so that holder 232 can be inserted into surrounding mounting 241.

The longitudinal axis of holder 232 there extends in the same direction in which the surrounding mounting can be moved along the holder while surrounding it.

It is further provided that the surrounding mounting can at the end facing away from the blank be brought into contact with stop 231 on the milling machine. When the blank is correctly seated in the milling machine, it is there in particular provided that surrounding mounting 241 is arranged on holder 232 or surrounds the latter and is brought into contact with stop 231. A positive-locking fit of the blank in the milling machine can be ensured as, in particular, tilting of surrounding mounting 241 relative to holder 232 is prevented by stop 231.

In order to ensure a detachable positive-locking and force-locking connection of the blank to the milling machine, additional elements can be provided both on the surrounding mounting as well as, for example, complementary thereto, on holder 232 of the milling machine.

Figure 3A:
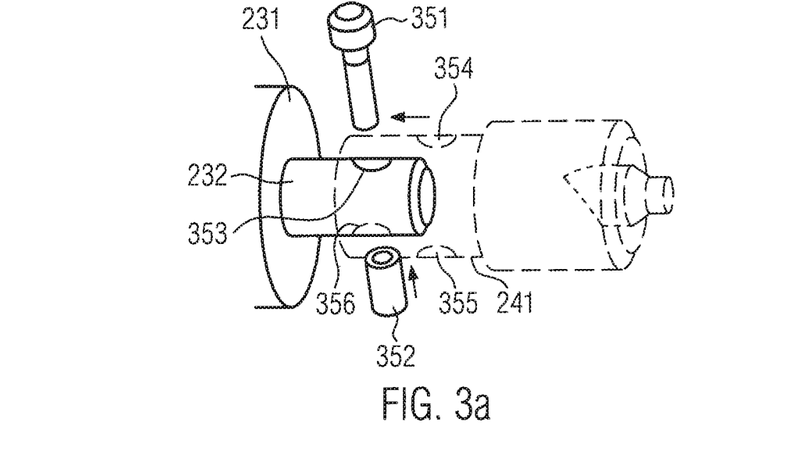
FIGS. 3a and b Schematic representation of two embodiments of the holder and the surrounding mounting.

FIG. 3a shows an exemplary embodiment. It is there provided that at least one device 353 is formed in holder 232 for establishing a detachable connection to the surrounding mounting. It is in one embodiment provided that this device 353 comprises an opening or a thread for a screw 351. Correspondingly, surrounding mounting 241 of the blank comprises an opening 354 through which screw 351 can be guided and connected, in particular screwed, to holder 232. By screwing screw 351 through the surrounding mounting of the blank to holder 232, a detachable positive-locking and force-locking connection of the blank to holder 232 in the milling machine can be ensured.

By suitable selection of the distance between the opening in the holder and the respective opening in surrounding mounting 241 of the blank in relation to stop 231, it can furthermore be ensured that the screw connection can only be effected if the surrounding mounting has been brought into contact with stop 231. The distance of the actual material 242, from which the dental component is to be formed, in relation to stop 231 is thereby defined exactly. Furthermore, tilting of the blank relative to holder 232 is thereby prevented, since the surrounding mounting is brought into contact with stop 231.

Figure 4A:
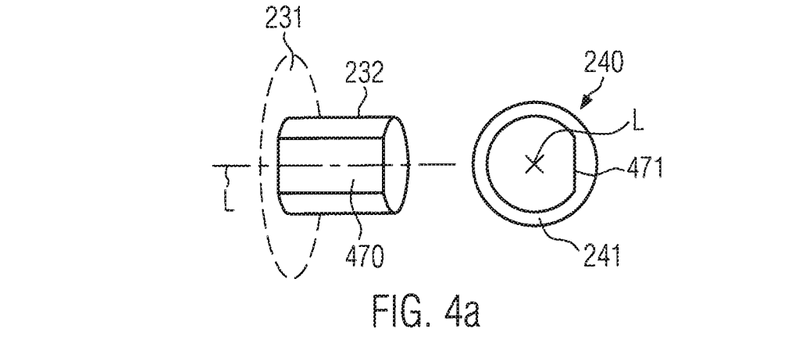
FIGS. 4a and b Schematic representation of two embodiments of the holder and the surrounding mounting with different cross-sectional areas.
Figure 4B:
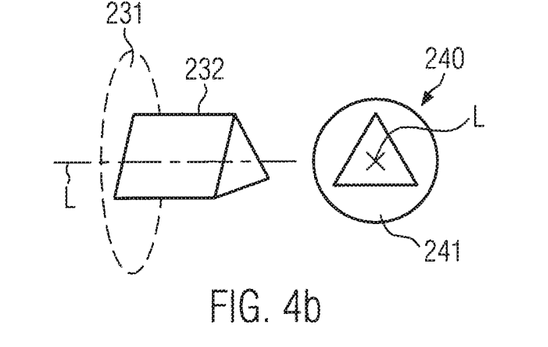

It can for this purpose be provided, for example, that the part of surrounding mounting 241 facing away from the blank comprises a cross-section which is substantially configured as a ring and can be brought into contact with the stop of the milling machine. Examples of the cross-section are shown in FIGS. 4a and 4b. In order to increase the contact surface, it can also be provided that the surrounding mounting in this region has a larger diameter than in the remaining region.

In order to—possibly entirely—prevent the blank from tilting, both the surface on the surrounding mounting, which is brought into contact with the stop, as well as stop 231 itself must be as flat as possible. It is there provided that deviations of stop 231 from a plane are at most 10 μm, preferably 5 μm, particularly preferably less than 3 μm. It is likewise preferred if the region of surrounding mounting 241, which is brought into contact with stop 231, deviates from a plane only by a few micrometers, particularly preferably less than 5 µm. This deviation is there to be understood such that, relative to an imaginary plane representing the mean value of the real plane defined by the stop, the deviations of the real plane defined by the stop amount to at most the stated values. The same applies to the surrounding mounting.

The distance of the opening in holder 232 from stop 231 as well as opening 354 from the end of surrounding mounting 241 facing away from the blank should to the degree possible be the same so that the surrounding mounting is actually brought into contact with stop 231 when screw 351 is screwed through the openings. In order to further promote this, it can be provided that the distance of the opening in holder 232 from stop 231 is slightly smaller than the distance from opening 354 to the end of the surrounding mounting facing away from the blank. If the surrounding mounting is then connected to the holder, for example by way of a screw, then the resulting tightening force of the surrounding mounting in the direction of stop 231 causes reliable abutment of the surrounding mounting against stop 231. The distance of the opening in holder 232 from stop 231 can there be, for example, 0.1 mm, preferably 50 µm, particularly preferably 20 µm smaller than the distance of opening 354 from the end of the surrounding mounting facing away from the blank. Though large differences in the distances increase the resulting tightening force of the surrounding mounting in the direction of the stop, they also lead to increased stresses in the material, which can lead to deformations and misalignments. Differences in the distances of the openings are therefore preferred which, though ensuring a tightening force of the surrounding mounting in the direction of the holder, do not cause any deformations of the material.

In order to further improve the positive-locking and force-locking fit of the surrounding mounting on holder 232, it can be intended that at least two screws or two elements 351 and 352 are provided which can be screwed into one another, and accordingly two openings in holder 232 and two openings in surrounding mounting 241. It is particularly preferred if a screw 351 is used and a sleeve 352 which comprises an opening with a thread for screw 351. The openings in holder 232 and surrounding mounting 241 are then formed to be disposed opposite to one another. This means that the connecting line between the centers of the openings intersect the longitudinal axis L of surrounding mounting 241 and the longitudinal axis of holder 232. Since an additional mechanical coupling is created by use of the sleeve and the screw, the positive-locking and force-locking seat of the surrounding mounting on holder 232 is further improved.

In order to prevent the blank from accidentally being mounting rotated by 180° relative to the actually intended position, it can be provided that screw 351 and sleeve 352 can be screwed onto the holder only in the correct orientation of the surrounding holder. This can be realized, for example, by openings of different sizes in surrounding mounting 241 and the holder, where the insertion of screw 351 or of sleeve 352, respectively, is enabled only in the correct orientation of opening 354 or 355, respectively, above the corresponding opening 353 or 356, respectively, of the holder.

When two screws are used, this can also be ensured by having the openings in the holder or the mounting be provided at a certain angle relative to one another that differs from 180°. For example, opening 354 and opening 355 in the surrounding mounting can be rotated by 90° with respect to the longitudinal axis L (the same applies for openings 353 and 356, respectively, in the holder), so that only with appropriate alignment of the surrounding mounting with respect to holder 232 is it at all possible to insert the screws.

Figure 3B:
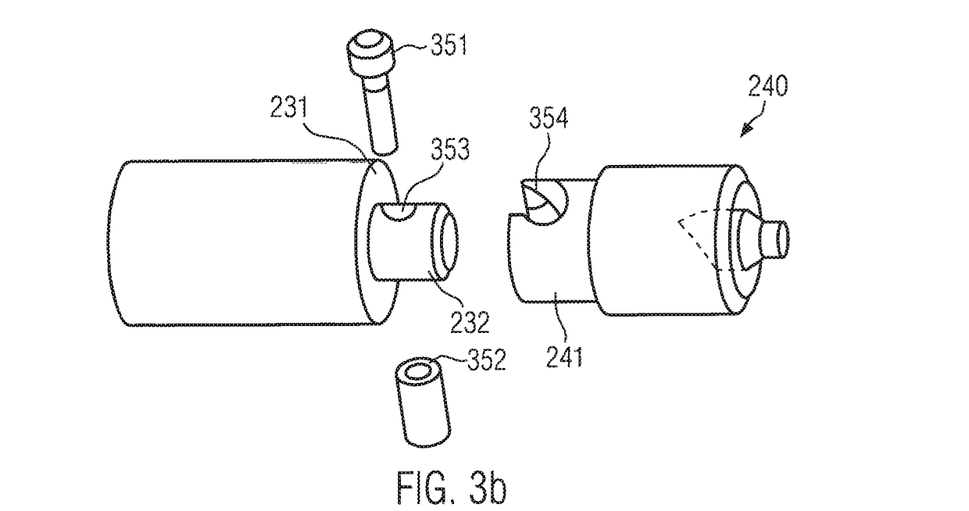

FIG. 3b shows a further embodiment in which surrounding mounting 241, instead of a complete opening, comprises a recess at the end of the surrounding mounting facing away from the blank, through which corresponding screw 351 or—as described with reference to FIG. 3a—sleeve 352, can be inserted. The surrounding mounting in this case does not comprise a complete ring on the side facing away from the blank, but two or more ring segments which are separated from one another by the recesses. These ring segments as well are brought into contact with the stop in the same way like the complete ring and fulfill respective requirements regarding the accuracy with respect to deviations from an imaginary plane.

It can in the embodiments shown in FIGS. 3a and 3b be provided that the openings in the holder and in the surrounding mounting have no thread but a smooth limiting surface. Furthermore, screw 351 can preferably be designed as a countersunk head screw and sleeve 352 as a countersunk nut with an internal thread.

In order to prevent undesirable rotation of sleeve 352 (in particular of the countersunk nut) when the screw is being screwed in, it can in the embodiment shown in FIG. 3b be provided that the sleeve has a flattened region which can be brought into contact with stop 231. A positive lock with respect to a degree of freedom of rotation of sleeve 352 can thereby be obtained and co-rotation is prevented when the screw is screwed in.

Alternatively or in combination therewith, it can be provided that the outer shape of holder 232 and surrounding mounting 241 is not symmetrical with respect to the longitudinal axis. This is illustrated in FIG. 4.

It is according to the embodiment shown in FIG. 4a provided that the holder is in principle formed to be cylindrical, where the longitudinal axis L extends through the imaginary axes of symmetry of a respective cylinder. Holder 232, however, comprises at least one flat point 470 at one location. Several flat points can there also be provided and distributed, for example, equidistantly on the circumference of holder 232. In the case of non-equidistant distribution of these flat points on the circumference of holder 232, it can in connection with the surrounding mounting be ensured that the surrounding mounting can only be placed on holder 232 in precisely one orientation.

A cross-section through surrounding mounting 241 of blank 240 is for this further shown in FIG. 4a. The longitudinal axis L runs perpendicular to the paper plane. While the outer shape of surrounding mounting 241 can be cylindrical or approximately cylindrical, but can in principle also be arbitrarily shaped in order to ensure abutment against stop 231, the inner shape is shaped to be complementary to the outer shape of holder 232. This means in particular that the inner shape of surrounding mounting 241 comprises a region 471 in the form of a flat point which corresponds in size and shape to flat point 470 on holder 232.

It can alternatively also be provided that holder 232 is configured having a different geometric shape, for example, like a prism, as shown in FIG. 4b. The longitudinal axis of holder 232 there runs perpendicular to stop 231 on the milling machine. The cross-section of surrounding mounting 241 can in analogy perpendicular to the longitudinal axis L have a respective inner cross-sectional shape of a prism, so that blank 240 can be made to engage with holder 232 via surrounding mounting 241 on the milling machine and brought into contact with stop 231.

Figure 5A:
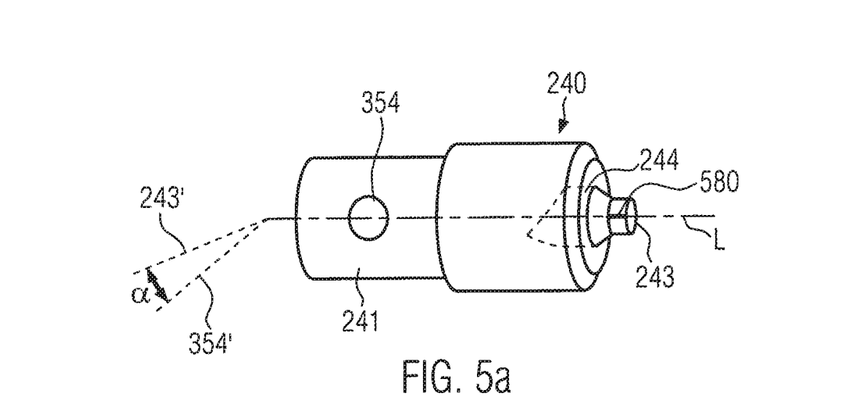
FIGS. 5a and b Schematic representation of the orientation of the blank with respect to the connection geometry.
Figure 5B:
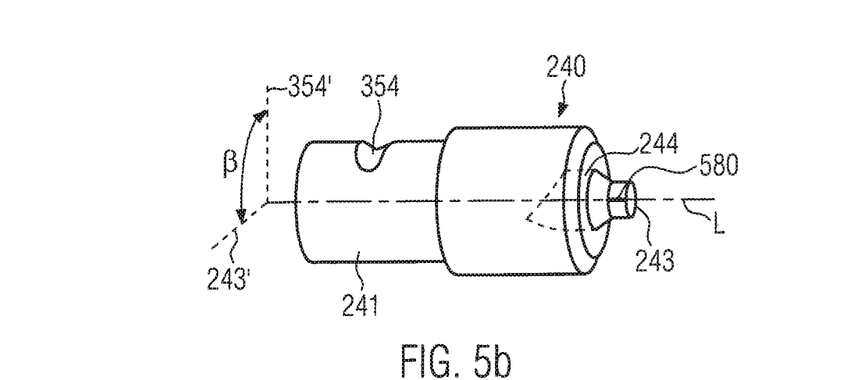

FIGS. 5a and 5b show the orientation of opening 354 in surrounding mounting 241 in relation to a connection geometry 580 prescribed by pin 243. For the sake of simplicity, connection geometry 580 is presently schematically illustrated as a strip. The orientation is represented by dashed line 243'. Determination of this orientation 243' is there basically arbitrary but in FIGS. 5a and 5b done on the same basis. For example, a connecting line between connection geometry 580 on the surface of the pin and the longitudinal axis L can be selected, where this connecting line is perpendicular to the longitudinal axis. The resulting line can be understood as being characteristic of the orientation of the connection geometry 580. Similarly, the orientation of opening 354 can be determined such that a connecting line is from the center of the opening formed perpendicular to the longitudinal axis L so that orientation 354' is defined.

In FIG. 5a, the opening is rotated by an angle α with respect to connection geometry 580, so that orientations 243' and 354' enclose a corresponding angle α relative to one another. Dental component 244 to be produced from blank 240 would therefore have a specific first orientation with respect to connection geometry 580, which is by way of example presently shown in dashed lines.

In FIG. 5b, opening 354 and therefore the prescribed orientation of the surrounding mounting relative to the holder of the milling machine is rotated by an angle β with respect to connection geometry 580. This results in a different orientation of dental component 244 to be produced from blank 240, as is there also shown in a dashed manner.

The selection of the openings or generally of the connecting elements of the surrounding mounting, which enable establishing a detachable connection to the holder of the milling machine, relative to connection geometry 580 allows for orientation with high accuracy of the dental component to be produced from the blank in relation to this connection geometry. Blank 240 as such is oriented as precisely as possible on the milling machine by way of the surrounding mounting and the connecting elements for establishing the detachable connection to the holder and the stop, so that the dental component can also be milled according to the prescribed connection geometry with only minimal deviations.

The invention claimed is:

1. A combination for producing a dental component, the combination comprising:
   a blank having a surrounding mounting in which two opposing mounting openings are formed; and
   a milling machine for producing the dental component from the blank, the milling machine comprising:
   a stop; and
   a holder for receiving the surrounding mounting of the blank, the holder having two opposing openings, and said holder being designed such that the exterior thereof is surrounded by the surrounding mounting of the blank,
   wherein a connecting line between centers of the two opposing openings in the holder extends through a longitudinal axis of said holder,
   wherein the blank, via the surrounding mounting thereof, is detachably connected to the holder, and
   wherein, when the blank is connected to the holder, the surrounding mounting of the blank is brought into contact with the stop for positioning purposes, and the two opposing mounting openings are aligned with the two opposing openings of the holder such that a screw is able to extend into each of said two opposing mounting openings and said two opposing openings.

2. The combination according to claim 1, wherein said stop defines a plane and the longitudinal axis of said holder is perpendicular to said plane, and where said holder is shaped symmetrically or asymmetrically with respect to said longitudinal axis.

3. The combination according to claim 2, wherein said holder is shaped asymmetrically with respect to the longitudinal axis and has at least one flat surface parallel to said longitudinal axis.

4. The combination according to claim 2, wherein an orientation of said blank with respect to said stop is defined by the shape of said holder.

5. The combination according to claim 1, wherein the dental component is a crown or an abutment.

6. The combination according to claim 1, wherein the screw screws into a threaded sleeve.

* * * * *

UNITED STATES PATENT AND TRADEMARK OFFICE
CERTIFICATE OF CORRECTION

PATENT NO. : 11,007,041 B2  
APPLICATION NO. : 15/520117  
DATED : May 18, 2021  
INVENTOR(S) : Peter Schelling et al.

Page 1 of 1

It is certified that error appears in the above-identified patent and that said Letters Patent is hereby corrected as shown below:

On the Title Page

Item (73), Column 1, Assignee, Line 1, after "AG" insert -- (AT) --

Signed and Sealed this  
Ninth Day of November, 2021

Drew Hirshfeld  
*Performing the Functions and Duties of the*  
*Under Secretary of Commerce for Intellectual Property and*  
*Director of the United States Patent and Trademark Office*